United States Patent [19]

Uesugi

[11] Patent Number: 4,881,138

[45] Date of Patent: Nov. 14, 1989

[54] CASSETTE LOADING APPARATUS

[75] Inventor: Masaki Uesugi, Katsuta, Japan

[73] Assignee: Hitachi, Ltd., Tokyo, Japan

[21] Appl. No.: 59,516

[22] Filed: Jun. 8, 1987

[30] Foreign Application Priority Data

Jun. 11, 1986 [JP] Japan .................................. 61-133612

[51] Int. Cl.$^4$ ............................................. G11B 15/00
[52] U.S. Cl. ................................................... 360/96.5
[58] Field of Search ......................................... 360/96.5

[56] References Cited

FOREIGN PATENT DOCUMENTS 58-148760 10/1983 Japan .

Primary Examiner—John H. Wolff
Attorney, Agent, or Firm—Antonelli, Terry & Wands

[57] ABSTRACT

A cassette loading apparatus is disclosed in which a guide slot is formed in one of a cassette receiving portion for receiving and holding a tape cassette in place and a base plate fixed to a chassis, and an engagement portion for engaging with the guide slot is formed in the other. On each side of the apparatus, there is provided a pivotable link between the cassette receiving portion and the base plate.

1 Claim, 4 Drawing Sheets

CASSETTE LOADING APPARATUS

BACKGROUND OF THE INVENTION

The present invention relates to a cassette loading apparatus for moving a tape cassette in a direction from an insert position to a loaded position or in the opposite direction thereto.

A conventional cassette loading apparatus of this type is shown in FIG. 5. In FIG. 5, a cassette receiving portion 1 for receiving and holding a tape cassette (not shown) has a lower side wall in which a guide slot 1a is formed so as to extend in a horizontal direction. A base plate 2 is fixedly formed on a chassis (not shown) and has a side wall in which is formed is a guide slot 2a in the form of an arcuate shape. A first link 8 and a second link 9 are connected at their centers to each other to form a cross-shape or cruciform. The first link is pivotally connected at one end to the side wall of the cassette receiving portion 1, and is provided at the other end with a pin 11 implanted therein and slidably engaged with the guide slot 2a of the base plate 2. On the other hand, a pin 10 implanted at one end of the second link 9 is slidably engaged with the guide slot 1a of the cassette receiving portion 1, and the other end thereof is pivotally supported to the base plate 2. Although one set of the cruciform or cross links 8, 9 is shown in FIG. 5, another set of cruciform links is provided in the apparatus between the other side wall of the cassette receiving portion 1 and another base plate having the same configuration as that of the above described base plate 2, so that the respective sets of the cruciform links are operated in synchronism with each other by means of a suitable shaft (not shown).

In the thus constructed cassette loading apparatus, the tape cassette (not shown) is to be inserted in a direction indicated by the arrow into the cassette receiving portion in the raised position (i.e., insert position) shown in FIG. 5. Under this condition, the cassette receiving portion 1 is pressed toward the base plate 2, the cross links 8 and 9 are collapsed with their pins 10 and 11 being slid along the respective guide slots 1a and 2a. As a result, the tape cassette is moved to the loadable position (i.e., loaded position) together with the cassette receiving portion 1.

As described above, the conventional cassette loading apparatus must use the cross two-link mechanism having the two links 8 and 9. Therefore, in order to connect both the links 8 and 9 to the cassette receiving portion 1 and the base plate 2, a large number of mechanical parts (for example, pins 10 and 11) are required as well as the connecting pin 12 for connecting the links 8 and 9 to each other. This is one of factors which prevents substantial reduction in manufacture cost.

SUMMARY OF THE INVENTION

Accordingly, in order to overcome the abovenoted defects inherent in the conventional apparatus, an object of the present invention is to provide a cassette loading apparatus in which the number of mechanical parts is considerably reduced to reduce the manufacture cost.

This and other objects of the present invention are attained by providing a cassette loading apparatus in which a guide slot is provided in either one of a cassette receiving portion and a base plate, an engagement portion such as a pin engaging with the guide slot is provided in the other component, and the cassette receiving portion and the base plate are connected in a collapsible manner by means of a single link but not a cross link mechanism.

With such a structure, it is possible to control the posture or position of the cassette receiving portion by a relative movement between a portion pivotally supporting the link to the cassette receiving portion and the engagement portion within the guide slot. Accordingly, it is possible to provide a collapsible cassette loading apparatus with the single link (two links on opposite sides), thereby considerably reducing the number of mechanical parts in comparison with the conventional apparatus.

DESCRIPTION OF THE PREFERRED EMBODIMENTS

Embodiments of the invention will now be described with reference to the accompanying drawings.

Figure 1:
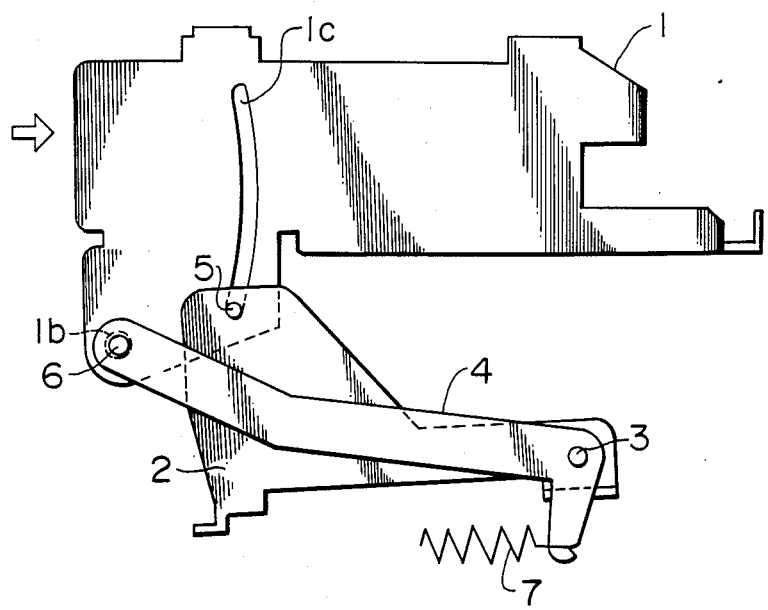
FIG. 1 is a side elevational view showing a raised position of a cassette loading apparatus according to one embodiment of the invention.
Figure 2:
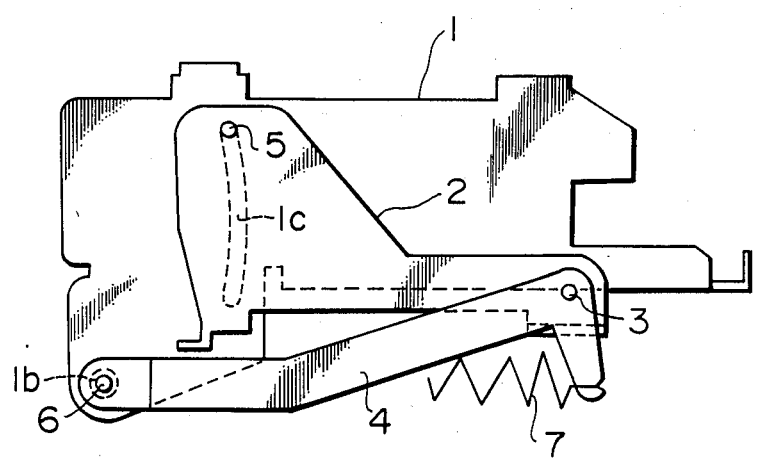
FIG. 2 is a side elevational view showing a depressed position of the apparatus shown in FIG. 1.
Figure 3:
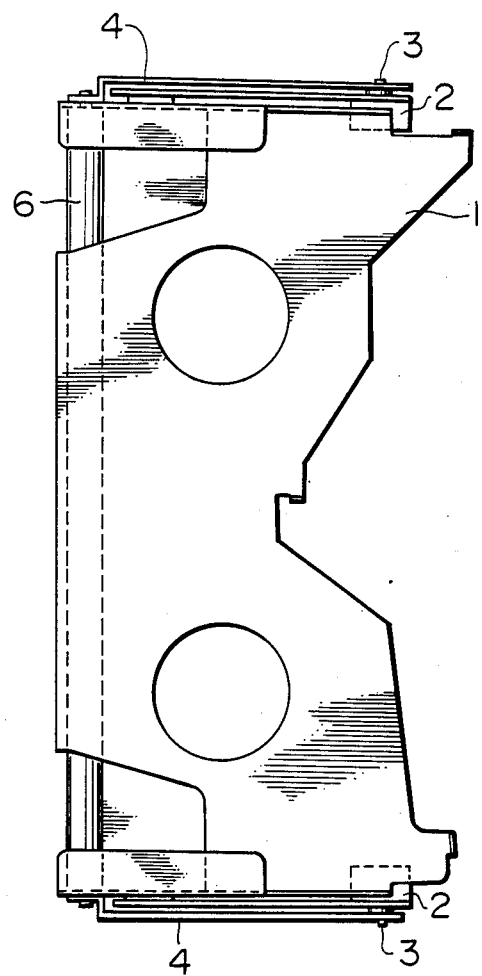
FIG. 3 is a plan view of the apparatus.
Figure 5:
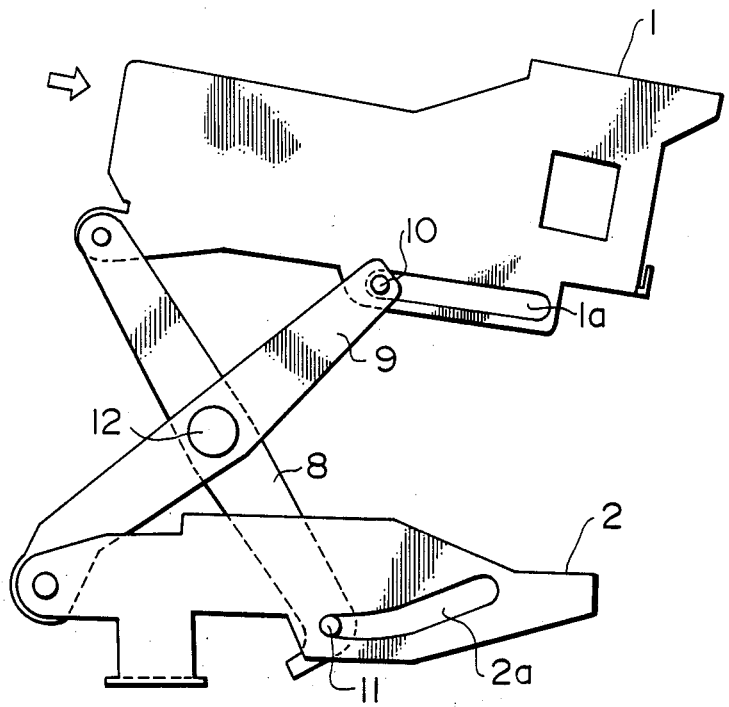
FIG. 5 is a side elevational view showing a conventional cassette loading apparatus.

FIG. 1 is a side elevational view showing a raised position (i.e., insert position) of a cassette loading apparatus in accordance with a first embodiment of the invention, FIG. 2 is a side elevational view showing a depressed position (loaded position) of the apparatus, and FIG. 3 is a plan view of the cassette loading apparatus, in which the same reference numerals as those used in FIG. 5 are used to indicate like components or members.

A cassette receiving portion 1 is composed of a metal plate that is bent to have a U-shaped cross-section. In each of opposite side walls of the cassette receiving portion 1, a circular hole 1b and a vertically extending guide slot 1c are formed at a predetermined interval. A synchronizing shaft 6 is rotatably inserted into the circular holes 1b. Links 4 are fixed to opposite ends of the synchronizing shaft 6. An angled portion near to the other end of each link 4 is pivotally supported to a base plate 2 through a pivot shaft 3. Each link 4 is biased clockwise (in FIG. 1) by a spring 7 provided between the link 4 and a chassis (not shown). A shaft 5 is implanted in an upper portion of each base plate 2 and is engaged with the above-described guide slot 1c.

In the thus constructed cassette loading apparatus, a tape cassette (not shown) is inserted into the cassette receiving portion 1 in a direction indicated by the arrow in FIG. 1 and is held therein. Under this condition, the cassette receiving portion 1 is depressed toward the base plates 2, so that the links 4 are rotated counterclockwise against the springs 7 about the pivot shaft 3. As a result, the tape cassette is moved to a loadable position (loaded position) shown in FIG. 2 together with the cassette receiving portion 1. During the movement of the cassette receiving portion 1, the guide slots 1c of the cassette receiving portion 1 are moved relative to the shafts 5 formed on the base plate 2. Therefore, the posture or position of the cassette receiving portion 1 depends upon the configuration of the guide slots 1c. According to the embodiment, the configuration of the guide slots 1c is designed so that the cassette receiving portion 1 may be moved while keeping its horizontal condition.

According to the first embodiment, the number of the mechanical parts such as the link members and the connecting members is largely reduced in comparison with the conventional link mechanism in which two-cross links are used in combination. Thus, it is possible to considerably reduce the cost of the overall cassette loading apparatus.

Figure 4:
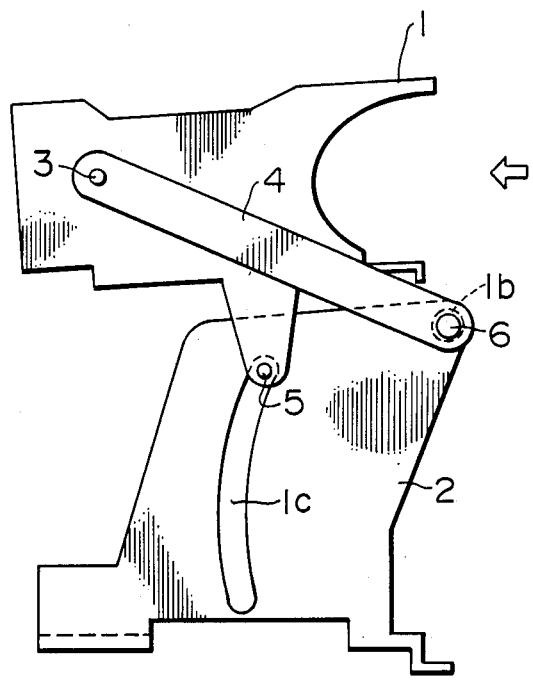
FIG. 4 is a side elevational view showing a raised position of a cassette loading apparatus in accordance with another embodiment of the invention.

In the first embodiment, the substantially vertically extending guide slot 1c is formed in the cassette receiving portion 1, whereas the shafts 5 engaging with the guide slots 1c are formed on the base plate 2. However, this arrangement may be reversed. Namely, as shown in FIG. 4, it is possible to arrange these components so that the guide slots 1c are formed in the base plate 2, whereas the shafts 5 are provided in the cassette receiving portion 1. In this case, the same advantages are enjoyable.

As has been described, according to the present invention, since the number of the mechanical parts is largely reduced in comparison with the conventional cross link mechanism, it is possible to provide a low cost cassette loading apparatus.

I claim:

1. A cassette loading apparatus including:
   a cassette receiving portion for receiving and holding a tape cassette in place;
   a base plate fixed to a chassis;
   said cassette receiving portion being collapsible toward said base plate so that said cassette receiving portion is movable from a cassette loading position to a loaded position;
   said cassette receiving portion having at least a pair of opposite side walls, each of said side walls being provided with only one link which extends between and is pivotally connected to both said cassette receiving portion and said base plate;
   a projection directly attached to said base plate, at each of the locations near the link pivotal supporting portion of said cassette receiving portion;
   a generally vertical guide slot formed in said cassette receiving portion at each of said locations, the slots respectively receiving the projections therein to maintain the posture of said cassette receiving portion during the movement thereof; and
   a spring adapted to bias said cassette receiving portion in a direction toward said loading position.

* * * * *